(12) United States Patent
Yin et al.

(10) Patent No.: US 8,462,758 B2
(45) Date of Patent: Jun. 11, 2013

(54) CHANNEL QUALITY INFORMATION FEEDBACK TECHNIQUES FOR A WIRELESS SYSTEM

(75) Inventors: Hujun Yin, San Jose, CA (US); Roshni M. Srinivasan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1461 days.

(21) Appl. No.: 11/613,983

(22) Filed: Dec. 20, 2006

(65) Prior Publication Data

US 2008/0153506 A1    Jun. 26, 2008

(51) Int. Cl.
*H04B 7/208*    (2006.01)
*H04J 1/00*    (2006.01)

(52) U.S. Cl.
USPC .......................................... 370/344; 370/343

(58) Field of Classification Search
USPC .. 455/450–453, 464; 370/335, 395.4–395.43, 370/203, 204, 208, 343, 344
See application file for complete search history.

(56) References Cited

U.S. PATENT DOCUMENTS

| | | | |
|---|---|---|---|
| 6,215,827 B1 | 4/2001 | Balachandran et al. | |
| 2004/0171401 A1* | 9/2004 | Balachandran et al. | ...... 455/522 |
| 2004/0179493 A1 | 9/2004 | Khan | |
| 2005/0025039 A1 | 2/2005 | Hwang et al. | |
| 2005/0201295 A1 | 9/2005 | Kim et al. | |
| 2005/0201474 A1 | 9/2005 | Cho et al. | |
| 2005/0237989 A1* | 10/2005 | Ahn et al. | ...................... 370/343 |
| 2005/0276317 A1 | 12/2005 | Jeong et al. | |
| 2006/0072508 A1 | 4/2006 | Zou et al. | |
| 2006/0146920 A1 | 7/2006 | Suh et al. | |
| 2006/0148411 A1 | 7/2006 | Cho et al. | |
| 2007/0087772 A1* | 4/2007 | Yi et al. | ........................ 455/522 |
| 2007/0098098 A1* | 5/2007 | Xiao et al. | ................... 375/260 |
| 2007/0230397 A1* | 10/2007 | Sakata | .......................... 370/329 |
| 2009/0060081 A1* | 3/2009 | Zhang et al. | ................. 375/267 |

FOREIGN PATENT DOCUMENTS

| | | |
|---|---|---|
| EP | 1569403 A2 | 8/2005 |
| EP | 1578043 | 9/2005 |
| KR | 10-10625143 | 11/2005 |
| KR | 1020070027845 | 3/2007 |
| WO | 2005088870 A1 | 9/2005 |
| WO | 2006-073271 | 7/2006 |
| WO | 2008079654 A1 | 7/2008 |

* cited by examiner

*Primary Examiner* — Ajit Patel
(74) *Attorney, Agent, or Firm* — Kacvinsky Daisak PLLC

(57) ABSTRACT

Channel quality information feedback techniques for a wireless system are described. An apparatus may comprise a base station having base station logic to determine a channel quality indicator feedback dimension value representing a number of resource blocks for an orthogonal frequency division multiple access system to be measured by a subscriber station based on a matching ratio value, and a transceiver to send the channel quality indicator feedback dimension value to the subscriber station. Other embodiments are described and claimed.

22 Claims, 8 Drawing Sheets

600

DETERMINE A CHANNEL QUALITY INFORMATION FEEDBACK DIMENSION VALUE REPRESENTING A NUMBER OF RESOURCE BLOCKS FOR AN ORTHOGONAL FREQUENCY DIVISION MULTIPLE ACCESS SYSTEM TO BE MEASURED BY A SUBSCRIBER STATION BASED ON A MATCHING RATIO VALUE
602

SEND THE CHANNEL QUALITY INFORMATION FEEDBACK DIMENSION VALUE TO THE SUBSCRIBER STATION
604

FIG. 6

CHANNEL QUALITY INFORMATION FEEDBACK TECHNIQUES FOR A WIRELESS SYSTEM

BACKGROUND

Wireless access networks that use a multi-carrier access technique, such as orthogonal frequency division multiple access (OFDMA), allow the sub-channels and time slots of an OFDMA frame to be assigned to several users. Sub-channel quality and achievable throughput for each user may vary over time. Channel quality indicator (CQI) is a measure of sub-channel quality. Sub-channels may be allocated to users based on a variety of factors including but not limited to CQI. For example, CQI can be used to determine an appropriate modulation and coding scheme (MCS) to be applied to signals transmitted to a receiver. Communication of CQI, however, uses bandwidth that could otherwise be used to communicate other information such as data. Consequently, it is desirable to efficiently communicate CQI while taking into account limitations of available bandwidth.

BRIEF DESCRIPTION OF THE DRAWINGS

FIG. 6 illustrates one embodiment of a first logic flow.

DETAILED DESCRIPTION

Figure 1:
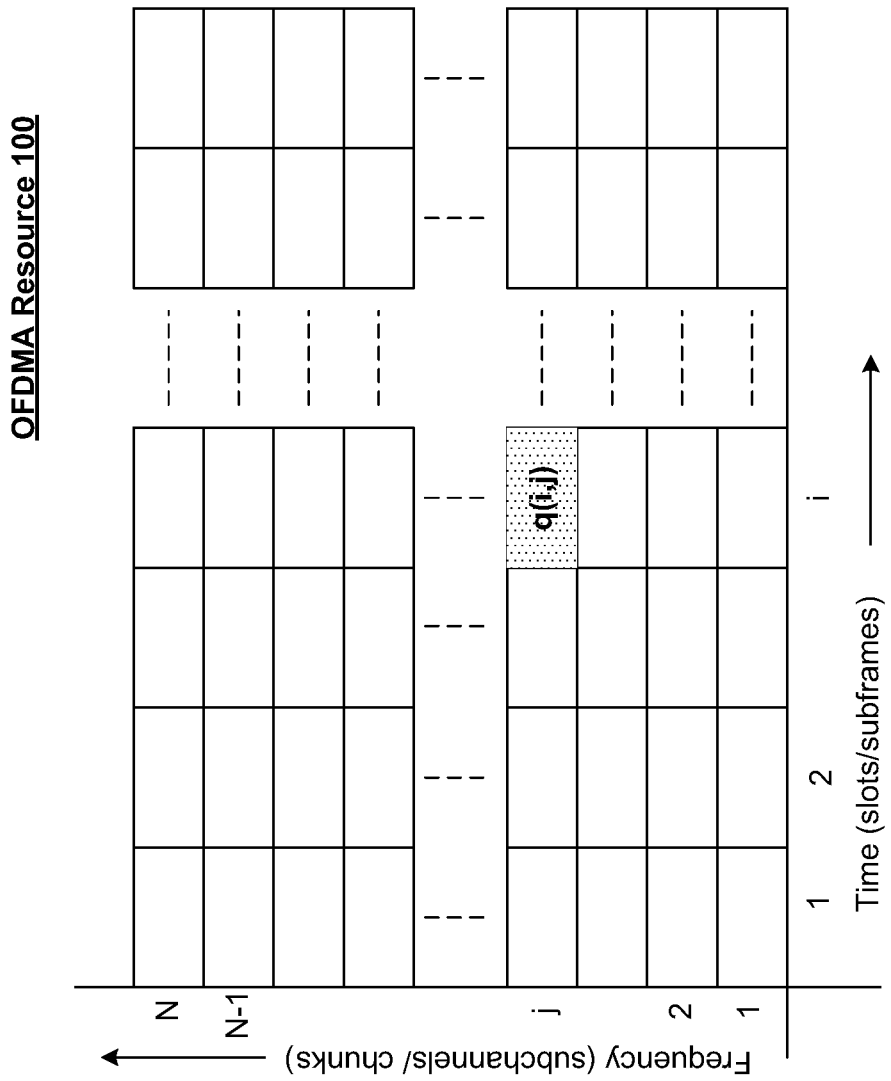
FIG. 1 illustrates one embodiment of an OFDMA resource.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be generally directed to channel quality information feedback techniques for a wireless communication system. Some embodiments may be particularly directed to an adaptive scheduling algorithm to adaptively determine an amount of channel quality information feedback needed to achieve a desired probability of sub-channel assignment based on system load and broadcasted allocation information. Some embodiments may provide techniques to improve the efficiency of channel quality information feedback from both a subscriber station and a base station. Some embodiments also quantify the trade-off between an amount of channel quality information feedback and the efficiency of sub-channel assignments. This facilitates design choices that can reduce channel quality information feedback overhead to prove system spectral efficiency by conserving valuable radio-frequency (RF) resources on uplink and/or downlink channels in the system.

In accordance with some embodiments, techniques are provided that are capable of determining a CQI feedback dimension value representing a number of resource blocks for an OFDMA system to be measured by a subscriber station based on a matching ratio value, and sending the CQI feedback dimension value to the subscriber station.

In accordance with some embodiments, techniques are provided that are capable of receiving a CQI feedback dimension value from a base station by a subscriber station, measure a channel quality for one or more resource blocks for an OFDMA system as indicated by the CQI feedback dimension value, and send a CQI representing the channel quality measurements to the base station.

Various embodiments may be used in a number of different applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, and 802.16m standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Some embodiments may be used in various other apparatuses, devices, systems and/or networks.

In various embodiments, base station or OFDMA schedulers in broadband wireless systems such as but not limited to 802.16e, 802.16m, or Third Generation Partnership Project (3GPP) LTE may allocate resource blocks comprising groups of sub-carriers which are referred to as sub-channels (802.16e) or chunks (LTE) in frequency and symbols or groups of symbols which are referred to as slots (802.16e) or sub-frames (LTE) in time. The schedulable OFDMA resource is two dimensional, for example, including OFDM symbols in the time domain and sub-carriers in frequency domain. A subscriber station receiver may measure channel quality of transmitted resource blocks and provide a CQI to the base station, thereby allowing the OFDMA scheduler to take advantage of channel variations in both time and frequency. The CQI may represent a single resource block or multiple resource blocks as desired for a given implementation. In the latter case, for example, a code book technique may be utilized to represent multiple resource blocks using a single CQI value. The embodiments are not limited in this context.

In various embodiments, the use of channel aware OFDMA schedulers implemented at the base station can significantly improve system capacity and spectral efficiency in broadband cellular wireless systems. These schedulers rely heavily on estimates of channel quality or CQI provided by the competing subscriber stations. The overhead associated with CQI impacts the available resource for uplink data scheduling and this poses a limitation on how much CQI can be fed back. CQI feedback is therefore a critical feature in the design of the air interface for broadband cellular wireless systems. The embodiments attempt to solve these and other problems using techniques that control the amount and type of CQI feedback provided by the subscriber stations to improve overall system performance.

FIG. 1 illustrates one example of an OFDMA resource 100. As shown in FIG. 1, the OFDMA resource 100 may comprise an allocated system bandwidth partitioned on a y-axis by frequency into multiple sub-carriers, sub-channels or chunks 1-N, a subset of which is represented as 1-$j$, and partitioned on an x-axis by time slots or sub-frames 1-$i$. In any given time slot, one or more CQI values for each subscriber station can be fed back for N sub-channels or chunks. A resource block may be represented as one or more slot/subchannels (self definition) q(i, j). Depending on a level of CQI feedback granularity selected for an OFDMA system, the CQI may represent channel measurement information for one or more resource blocks. As used herein, the granularity of the CQI feedback information may refer to the number of sub-channels, sub-carriers, chunks, or other resource blocks measured by a subscriber station to generate one or more CQI values.

Theoretically, the CQI value should provide the base station scheduler all the information necessary to optimally schedule sub-channels or chunks to competing subscriber stations. In practical systems, however, the CQI value is typically fed back for only a subset of the N available sub-channels due to feedback bandwidth limitations. Since the number of available sub-channels scales with system bandwidth, there is a practical limitation on the number of sub-channels for which the CQI value can be fed back.

There is a correlation or trade-off between the amount of CQI feedback and the corresponding scheduling gains that result from the availability of CQI at the desired level of CQI feedback granularity. A design challenge arises when attempting to determine how much CQI feedback granularity is needed to allow an OFDMA scheduler sufficient flexibility in allocating the OFDMA resource 100 to multiple competing subscriber stations. In low mobility scenarios, channel aware OFDMA schedulers can provide significant gains by exploiting frequency selectivity. The granularity of the frequency selective CQI information determines the flexibility that the scheduler has in matching the available resource to the competing subscriber stations with the best channel conditions.

The CQI feedback granularity may influence several aspects of an OFDMA system. For example, the granularity of the CQI feedback determines the amount of overhead required to signal this information. Typically, the amount of overhead consumed by the CQI feedback information increases as the number of competing subscriber stations in the OFDMA system increases. In another example, the granularity of the CQI feedback determines the amount of the OFDMA resource 100 that is remaining for scheduling data after accounting for the CQI feedback overhead. In yet another example, the granularity of the CQI feedback determines the complexity in scheduling resource blocks to contending subscriber stations and providing quality of service (QoS) guarantees.

In various embodiments, an OFDMA scheduler may be arranged to use an adaptive scheduling algorithm to improve the effectiveness of the CQI feedback from the subscriber stations to the base station. In some embodiments, the amount of CQI feedback is dynamically adjusted to the load on the wireless system. In some embodiments, the set of sub-channels selected for CQI feedback is selected based on the subscriber station's own channel quality as well as the observation of the channel quality of other allocated sub-channels broadcasted on the downlink.

The efficiency of sub-channel assignment may be quantified as a function of the CQI feedback granularity. Simulation results demonstrate diminishing gains in the efficiency of sub-channel assignment from increasing CQI feedback granularity. As a result, some embodiments may utilize a CQI for a relatively small subset of sub-channels to achieve most of the frequency selective scheduling gain, such as on the order of 2 to 3 sub-channels per subscriber station. Additionally, the amount of feedback is typically independent of the number of sub-channels in the system. This is contrary to conventional techniques that operate with the presumption that the CQI feedback overhead increases with the number of sub-channels in the OFDMA system.

Figure 2:
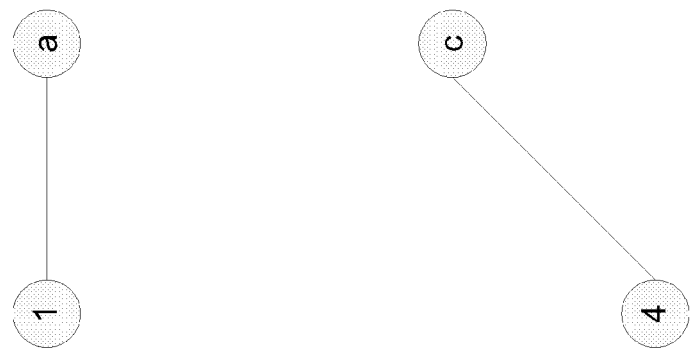
FIG. 2 illustrates one embodiment of a bipartite graph.
Figure 2:
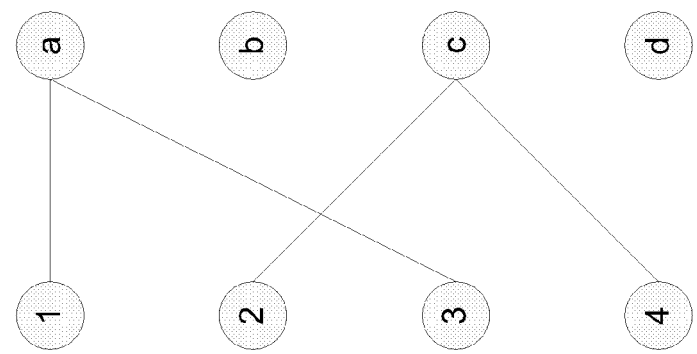

FIG. 2 illustrates one embodiment of a bipartite graph 200. The bipartite graph 200 illustrates an example of matching efficiency for an OFDMA system. The left hand side of FIG. 2 illustrates a set of competing subscriber stations 1-4 and a set of OFDMA resource blocks A-D. The subscriber stations 1, 3 are providing CQI feedback for resource block A, while the subscriber stations 2, 4 are providing CQI feedback for resource block C. None of the subscriber stations 1-4 are providing CQI feedback for resource blocks B, D. In this example, the bipartite graph 200 illustrates each subscriber station as connected to only the sub-channels within its feedback subset. The weight of each connection is determined by the CQI value. The OFDMA scheduling algorithm uses these weights and the desired scheduling metric to assign sub-channels to competing subscriber stations. Since the bipartite graph 200 is only partially connected and each sub-channel can be allocated to only one subscriber station, however, the output of the scheduling algorithm can be represented by the right hand side of FIG. 2. In this case, the OFDMA scheduling algorithm allocates the resource block A to subscriber station 1, and the resource block C to subscriber station 4. Since there was no feedback for the resource blocks B, D, the OFDMA scheduling algorithm was unable to provide a full matching for subscriber stations 2, 3 due in part to the limited CQI feedback set.

A set of definitions may be used to further examine the relationship between CQI feedback and matching results for an OFDMA scheduler. A feedback set for each subscriber station may comprise a set of sub-channels for which CQI feedback is provided. A matching set for each subscriber station may comprise a set of sub-channels allocated by the OFDMA scheduler. The degree of connectivity or matching between competing subscriber stations and allocated sub-channels is determined by the size of the feedback set. The matching size D is the number of sub-channels assigned to competing subscriber stations by the OFDMA scheduler. The matching ratio p may be defined as p=D/min(M, N), with the matching ratio being lowest when M=N.

One objective is to determine the relationship between the degree of connectivity and the maximum matching size. Consider the case when a subscriber station provides CQI feedback for the best sub-channel without prior coordination with the base station. In this special case, the degree of connectivity equals one (1) where each subscriber station reports exactly one (the best) sub-channel. In a system with M competing subscriber stations and N sub-channels, one design consideration is the expected matching size to determine whether every subscriber station can be potentially assigned a sub-channel.

The matching size and its relationship to CQI feedback may be defined in accordance with the following lemma or subsidiary proposition, where if D sub-channels are connected to at least one of the M subscriber stations, and each subscriber station only connects to one sub-channel N, then the matching size is D. The probability that the matching size is D when each of M subscriber stations provides CQI feedback information for only one of the N sub-channels may be defined by Equation (1) as follows:

$$p(D|M,N) \qquad \text{Equation (1)}$$

In accordance with the definition provided by Equation (1), the probability of a matching size of one (1) may be represented by Equation (2) as follows:

$$p(1|M, N) = N\left(\frac{1}{N}\right)^M = \left(\frac{1}{N}\right)^{M-1} \qquad \text{Equation (2)}$$

In order to develop an iterative expression for the probability of a matching size of D, consider the case when the Mth user is removed from the feedback set. If the Mth user was not part of the matching set, then the number of matches is D in spite of the Mth user being removed. On the other hand, if the Mth user was part of the matching set, then the number of matches is D-1, as shown in Equation (3) as follows:

$$p(D|M, N) = \qquad \text{Equation (3)}$$
$$\frac{1}{N-(D-1)} p(D-1|M-1, N) + \frac{1}{D} p(D|M-1, N)$$

When the number of sub-channels K for which CQI is fed back for each user is greater than 1, there is no closed form solution for the matching size D. The variable D, however, can be calculated by solving the bipartite matching problem for any given feedback pattern. This can be further described with reference to FIGS. 3, 4.

When every subscriber feeds back CQI corresponding to one sub-channel, the probability that a subscriber station is not assigned a channel can be approximated by Equation (4) as follows:

$$\left(1 - \frac{1}{N}\right)^M \qquad \text{Equation (4)}$$

when N is relatively large. As the number of sub-channels for which CQI feedback information is provided grows to infinity and the system bandwidth grows to infinity (M=N→∞), this probability approaches 1/e. As a result, when M=N→∞, the average number of subscriber stations that are assigned a requested sub-channel may be represented as Equation (5) as follows:

$$D = N(1 - 1/e) \qquad \text{Equation (5)}$$

Consequently, when M=N→∞ then D/N→1−1/e. In other words, if each subscriber station only feeds back the CQI corresponding to its best channel, approximately 63% of the subscriber stations can be assigned to sub-channels from their feedback set. Accordingly, in some design cases this may represent an acceptable level of sub-channel assignment even with a reduced amount of CQI feedback information.

Figure 3:
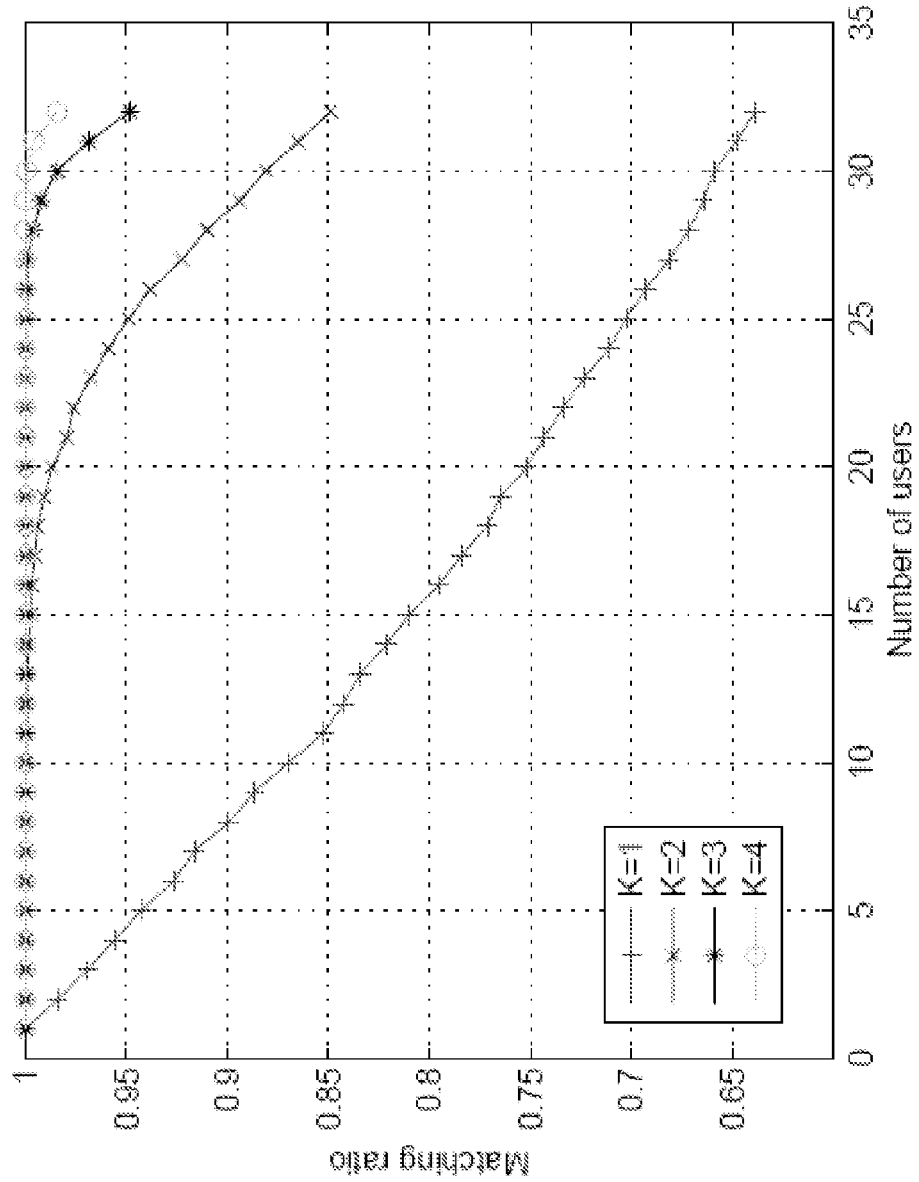
FIG. 3 illustrates one embodiment of a first matching ratio graph.

FIG. 3 illustrates one embodiment of a matching ratio graph 300. The matching ratio graph 300 illustrates a matching ratio between 0 and 1 on a y-axis, and a number of subscriber stations (users) between 0 and 35 on an x-axis. The matching ratio graph 300 shows the matching ratio when M subscriber stations each feed back CQI corresponding to K of the total N sub-channels randomly. In general, the matching ratio tends to decrease as M increases. The matching ratio is the lowest when M=N. When K=1, the worst-case matching ratio is approximately 63%. When K=2, the worst-case matching ratio improves to 85%. When K=3, the worst-case matching ratio further improves to 95%. Based on this information, it can be appreciated that a reasonably good matching ratio may be achieved if 2 or 3 good sub-channels are fed back by each subscriber station.

Figure 4:
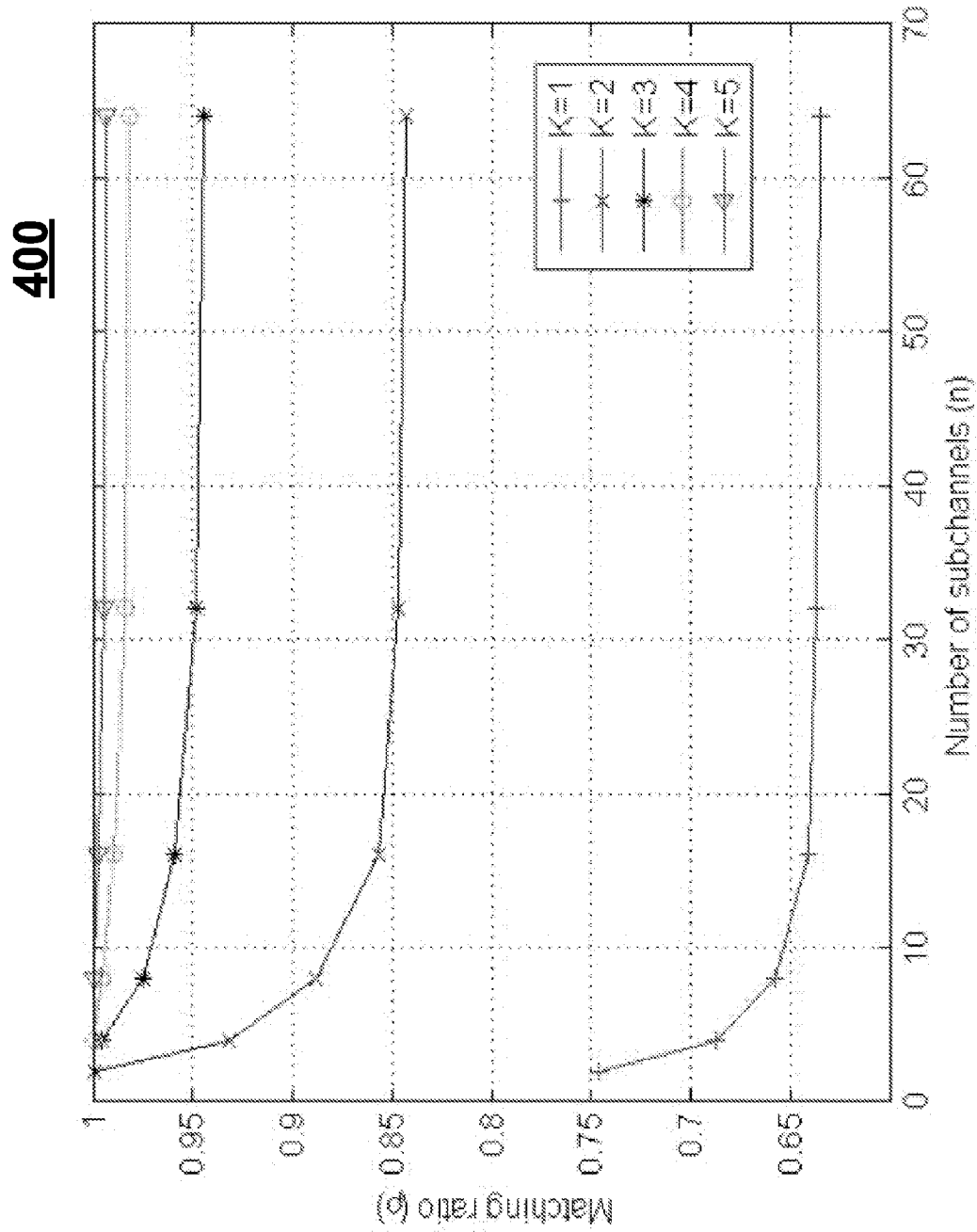
FIG. 4 illustrates one embodiment of a second matching ratio graph.

FIG. 4 illustrates one embodiment of a matching ratio graph 400. The matching ratio graph 400 illustrates a matching ratio between 0 and 1 on a y-axis, and a number of sub-channels between 0 and 64 on an x-axis. The matching ratio graph 400 shows the matching ratio as a function of the number of sub-channels N. The worst case matching ratio for M=N is plotted. As shown in FIG. 4, when the number of sub-channels is relatively small such as when N<10, the worst case matching ratio is better than it is for larger values of N. The matching ratio graph 400 clearly shows that the worst case matching ratio quickly converges to a constant for a given feedback dimension K. This saturation point occurs for a fairly small number of sub-channels. This suggests that increasing the number of sub-channels for a desired worst case matching ratio has a diminishing advantage. A relatively small feedback dimension of 3 results in the worst case matching ratio of approximately 95% or better. As illustrated, a higher CQI feedback dimension results in an even better worst case matching ratio result.

The above analysis provides a basis for adapting CQI feedback granularity to the current system load of a base station. Since the base station always has knowledge of the number of competing subscriber stations, the number of sub-channels for which CQI is being fed back, and the matching ratio at any given time, it can broadcast a CQI feedback dimension value K to the competing subscriber stations, where K represents the number of sub-channels for which it requires CQI feedback to achieve a desired matching ratio. If the system load is lighter where the number of competing subscriber stations is smaller, the CQI feedback dimension value K can be fed back for a larger number of sub-channels to improve spectral efficiency without increasing CQI feedback overhead beyond a desired threshold. On the other hand if the system load is higher, the CQI feedback dimension value K can be reduced to increase the available resource blocks from the OFDMA resource 100 for scheduling data and reducing feedback overhead.

Figure 5:
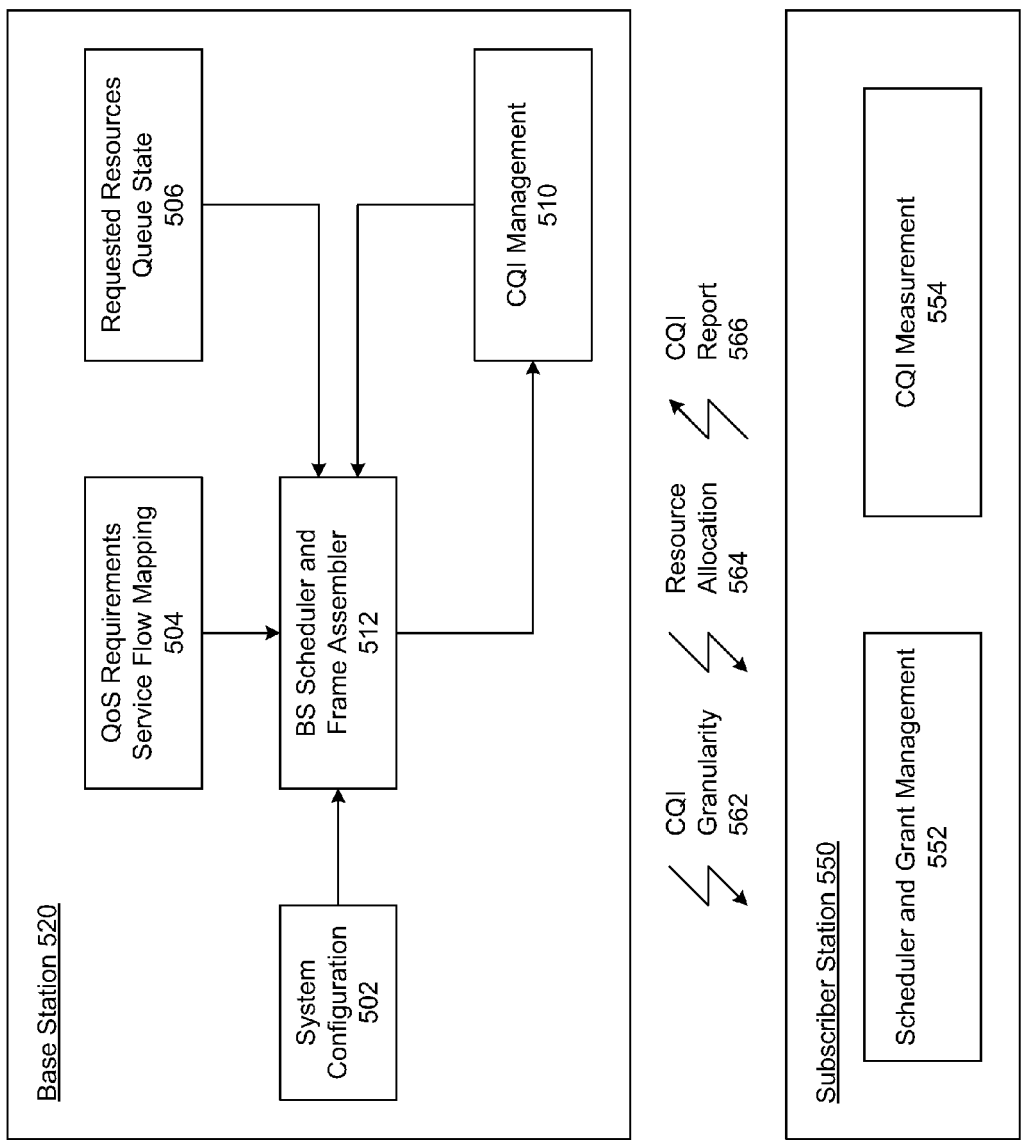
FIG. 5 illustrates one embodiment of a wireless communication system.

FIG. 5 illustrates one embodiment of a wireless communication system 500. The wireless communication system 500 is an example of a wireless communication system suitable for implementing the adaptive scheduling techniques described herein. As shown in FIG. 5, the wireless communication system 500 includes a base station 520 and a subscriber station 550. For sake of clarity, only one each of the base station 520 and the subscriber station 550 are shown, but it can be appreciated that the wireless communication system 500 can include multiple base stations similar to the base station 520, and multiple subscriber stations that are similar to the subscriber station 550, as desired for a given implementation. By way of example and not limitation, the wireless communication system 500 may be implemented as a wireless access network that uses a multi-carrier access technique such as but not limited to OFDM or OFDMA. The embodiments are not limited in this context.

In one embodiment, for example, the wireless communication system 500 may comprise an OFDMA system where the base station 520 can dynamically change the granularity of CQI feedback from the subscriber station 550 depending at least on a current load for the wireless communication system 500. The base station 520 may communicate such changes to the subscriber station 550 via a CQI granularity signal 562.

In one embodiment, for example, the base station 520 may include a system configuration logic 502. The system configuration logic 502 may be arranged to indicate an initial or default set of one or more sub-channels (K) for which CQI is to be measured by the subscriber station 550. The embodiments are not limited in this context.

In one embodiment, for example, the base station 520 may include a QoS requirements and service flow mapping logic 505. The QoS requirements and service flow mapping logic 504 may be arranged to maintain information related to quality of service and service flow for subscribers in a network. The embodiments are not limited in this context.

In one embodiment, for example, the base station 520 may include logic to manage requested resources and maintain queue state 506. The requested resources and queue state logic 506 may be arranged to manage downlink and uplink bandwidth allocated to subscriber stations such as subscriber station 550. The embodiments are not limited in this context.

In one embodiment, for example, the base station 520 may include a CQI management logic 510. The CQI management logic 510 may be arranged to generate a message to be transmitted to the subscriber stations to request CQI feedback from one or more subscriber stations for one or more sub-channels based in part on bandwidth allocated for use to provide CQI feedback. The embodiments are not limited in this context.

In one embodiment, for example, the base station 520 may include a base station scheduler and frame assembler logic 512. The base station scheduler and frame assembler logic 512 may allocate bandwidth based on subscriber needs. The base station scheduler and frame assembler logic 512 may allocate a region in a sub-frame for each unique subscriber station. The base station scheduler and frame assembler logic 512 may indicate a location of a region in a sub-frame allocated for the subscriber station 550. The base station scheduler and frame assembler logic 512 may set the bandwidth available for uplink communications from the subscriber station 550 to the base station 520 and vice-versa. For example, to increase bandwidth of data on uplink, the base station scheduler and frame assembler logic 512 may reduce bandwidth allocated to communication of CQI. For example, to reduce bandwidth allocated to communication of CQI, the base station scheduler and frame assembler logic 512 may reduce the granularity of CQI feedback. The base station scheduler and frame assembler logic 512 may provide frames for transmission to the subscriber station 550.

In various embodiments, the base station 500 may transmit to the subscriber station 550 various signals, including but not limited to a CQI granularity signal 562, and a resource allocation signal 564. The CQI granularity signal 562 may indicate the number of sub-channels (K) for which the subscriber station 550 is to make a CQI measurement. The resource allocation signal 564 may indicate to the subscriber station 550 where data is located in a received frame.

In one embodiment, for example, the subscriber station 550 may include a scheduler and grant management logic 552. The scheduler and grant management logic 552 may perform various operations, such as monitoring downlink transmissions from the base station 520 to identify unassigned resource blocks, or assigned resource blocks having a link quality below a defined link quality threshold, for example.

In one embodiment, for example, the subscriber station 550 may include a CQI measurement logic 554. Based on the CQI granularity signal 562, the CQI measurement logic 554 may perform channel measurements to measure a CQI at least the number of sub-channels identified by the CQI granularity signal 562. The CQI measurement logic 554 may be arranged to use any number of techniques to measure channel quality indicator, such as but not limited to Signal to Interference-plus-Noise Ratio (SINR) measurements, Modulation and Coding Scheme (MCS) option selection, and instantaneous rate feedback.

Once the requisite channel measurements have been taken, the subscriber station 550 may indicate the CQI to the base station 520 by transmitting a CQI report signal 566. The manner by which CQI is reported may comply with applicable standards such as but not limited to SINR measurements, Modulation and Coding Scheme (MCS) option selection, and instantaneous rate feedback.

Operations for apparatus 500 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using any desired hardware elements, software elements, or combination of both.

FIG. 6 illustrates a logic flow 600. Logic flow 600 may be representative of the operations executed by one or more embodiments described herein, such as the base station 520, for example. As shown in FIG. 6, the logic flow 600 may determine a CQI feedback dimension value representing a number of resource blocks for an OFDMA system to be measured by a subscriber station based on a matching ratio value at block 602. The logic flow 600 may send the CQI feedback dimension value to the subscriber station at block 604. The embodiments are not limited in this context.

In one embodiment, for example, the base station scheduler and frame assembler logic 512 may determine a CQI feedback dimension value representing a number of resource blocks for an OFDMA system to be measured by a subscriber station based on a matching ratio value. The matching ratio value may represent a ratio denoting a number of subscriber stations allocated a resource block relative to a number of subscribers stations requesting service to the wireless communication system 500 or a number of resource blocks allocated for the wireless communication system 500. In general, the base station scheduler and frame assembler logic 512 may increase the CQI feedback dimension value to increase the matching ratio value, and decrease the CQI feedback dimension value to decrease the matching ratio value.

In one embodiment, for example, the base station scheduler and frame assembler logic 512 may determine the matching ratio value based on a subscriber station value representing a number of subscriber stations requesting service to the wireless communication system 500, a matching set value representing a number of resource blocks allocated for the wireless communication system 500, and/or a matching size value representing a number of resource blocks assigned to the subscriber stations. In some cases, the matching ratio value may decrease as the subscriber station value increases.

In one embodiment, for example, the base station scheduler and frame assembler logic 512 may send the CQI feedback dimension value to the subscriber station 550. The base station scheduler and frame assembler logic 512 may receive a CQI representing a channel quality measurement for the resource blocks as indicated by the CQI feedback dimension value from the subscriber station 550.

In addition to improving operations for an OFDMA scheduler at the base station by implementing the adaptive techniques described above, some embodiments may also improve operations for a subscriber station to increase the efficiency of channel feedback generated by the subscriber station 550 and provided to the base station 520. For example, consider the case when M competing subscriber stations feed back CQI corresponding to their K most favorable sub-channels to the base stations. As described with reference to FIG. 2, some subscriber stations may have overlapping feedback sets. Depending on the scheduling algorithm, a subsequent allocation may not result in all K sub-channels being allocated to subscriber stations as requested.

The base station typically broadcast sub-channel assignments in the downlink channel. Each subscriber station can deduce information useful in generating a CQI feedback response. For example, each subscriber station can deduce whether a sub-channel is allocated: (1) to the monitoring subscriber station; (2) some other subscriber stations; or (3) remains unassigned. In another example, each subscriber station can deduce a rough estimate of the link quality of the sub-channels assigned to other subscriber stations. One way this may be accomplished is by using the coding/modulation format (MCS) associated with the sub-channel assignment. If the number of sub-channels assigned to one subscriber station is less than the number it requested, it can improve the chance of allocation in the next round by sending CQI feedback corresponding to any of the remaining unassigned sub-channels, or the sub-channels assigned to other subscriber stations with weaker link quality. If channel quality remains unchanged in previously allocated sub-channels, the subscriber station continues to feedback CQI on the assigned channels. Such techniques may be described in more detail with reference to FIG. 7.

Figure 7:
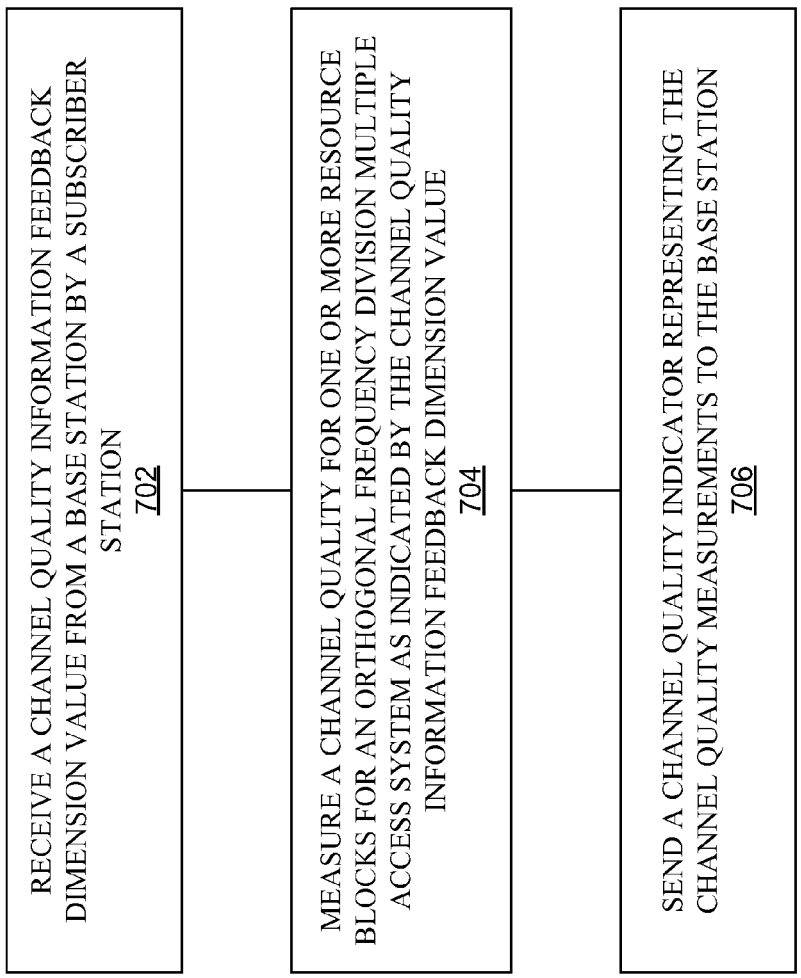
FIG. 7 illustrates one embodiment of a second logic flow.

FIG. 7 illustrates one embodiment of a logic flow 700. Logic flow 700 may be representative of the operations executed by one or more embodiments described herein, such as the subscriber station 550, for example. As shown in FIG. 7, the logic flow 700 may receive a CQI feedback dimension value from a base station by a subscriber station at block 702. The logic flow 700 may measure a channel quality for one or more resource blocks for an OFDMA system as indicated by the CQI feedback dimension value at block 704. The logic flow 700 may send a CQI representing the channel quality measurements to the base station at block 706. The embodiments are not limited in this context.

In one embodiment, for example, the CQI measurement logic 554 may measure a channel quality for a feedback set of resource blocks for the wireless communication system 500 as indicated by the CQI feedback dimension value via the CQI granularity signal 562. The feedback set may include a number of the unassigned resource blocks as indicated by the CQI feedback dimension value. Alternatively, the feedback set may include a number of assigned resource blocks assigned to other subscribers with a lower link quality value as indicated by the CQI feedback dimension value.

In one embodiment, for example, the scheduler and grant management logic 552 may monitor and identify unassigned resource blocks by monitoring downlink transmissions from the base station 520. The CQI measurement logic 554 may measure a channel quality for a number of the unassigned resource blocks as indicated by the CQI feedback dimension value. In this manner, the subscriber station 550 may increase a probability of the base station 520 allocating one or more of the unassigned resource blocks to the subscriber station 550 during the next cycle.

In one embodiment, for example, the scheduler and grant management logic 552 may identify assigned resource blocks having a link quality value lower than a defined link quality value. The CQI measurement logic 554 may measure a channel quality for a number of the assigned resource blocks as indicated by the CQI feedback dimension value. In this manner, the subscriber station 550 may increase a probability of the base station 520 re-allocating one or more of the assigned resource blocks from a subscriber station with a lower link quality to the subscriber station 550 with a higher link quality during the next cycle.

Figure 8:
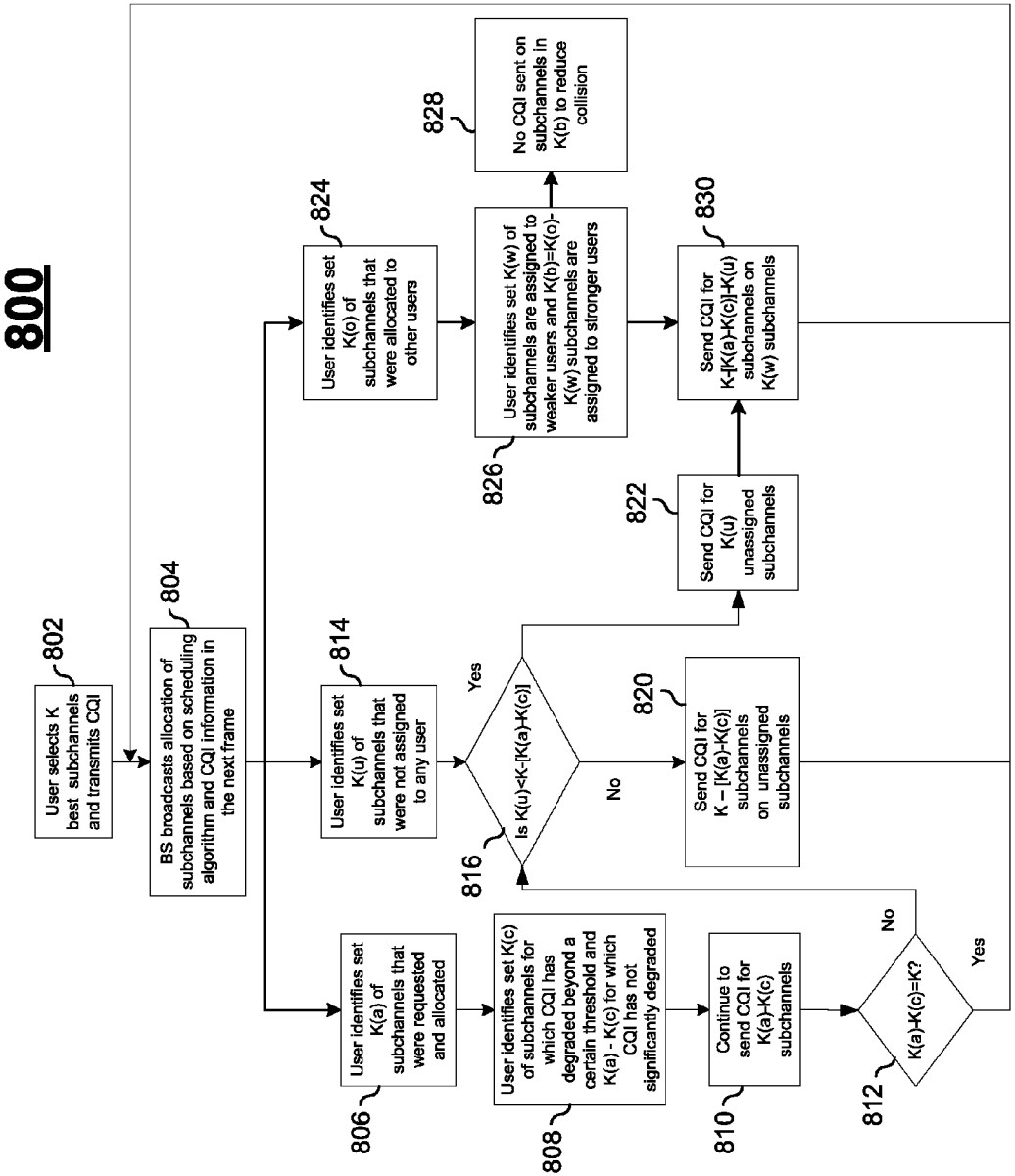
FIG. 8 illustrates one embodiment of a third logic flow.

FIG. 8 illustrates one embodiment of a logic flow 800. The logic flow 800 may be representative of an exemplary implementation for the adaptive technique performed by the subscriber station 550. As shown in FIG. 8, the subscriber station 550 may select K best sub-channels and transmit a CQI to the base station 520 at block 802. The base station 520 broadcasts an allocation of sub-channels based on an adaptive scheduling algorithm and the CQI information in the next frame at block 804. Three separate execution paths may occur in sequence or parallel.

In a first execution path, the subscriber station 550 identifies a set $K(a)$ of sub-channels that were requested and allocated at block 806. The subscriber station 550 identifies a set $K(c)$ of sub-channels for which the CQI has degraded beyond a certain threshold and $K(a)-K(c)$ for which CQI has not significantly degraded at block 808. The subscriber station 550 continues to send a CQI for $K(a)-K(c)$ sub-channels at block 810. A determination is made as to whether $K(a)-K(c) =K$ at diamond 812. If the determination is YES at block 812, the logic flow 800 passes control to block 804.

If the determination is NO at block 812, however, a determination is made as to whether $K(u)<K-[K(a)-K(c)]$ at block 816. If the determination is NO at block 816, then the subscriber station 550 sends a CQI for $K-[K(a)-K(c)]$ sub-channels on unassigned sub-channels at block 820, and the logic flow 800 passes control to block 804.

If the determination is YES at block 812, the subscriber station 550 sends a CQI for $K(u)$ unassigned sub-channels at block 822. The subscriber station 550 sends a CQI for $K-[K(a)-K(c)]-K(u)$ sub-channels on $K(w)$ sub-channels at block 830, and the logic flow 800 passes control to block 804.

In a second execution path, the subscriber station 550 identifies a set $K(u)$ of sub-channels that were not assigned to any subscriber station at block 814. The logic flow then passes control to the diamond 816, and the logic flow 800 proceeds as previously described.

In a third execution path, the subscriber station 550 identifies a set $K(o)$ of sub-channels that were allocated to other subscriber stations at block 824. The subscriber station identifies a set $K(w)$ of sub-channels that are assigned to weaker subscriber stations and K(b)=K(o)–K(w) sub-channels are assigned to stronger subscriber stations at block 826. In this case, the subscriber station 550 does not send a CQI on sub-channels in K(b) to reduce chances of collisions at block 828. The logic flow 800 then passes control to the block 830, and the logic flow proceeds as previously described.

Some embodiments, such as apparatus 100, may be implemented as a part, component or sub-system of an electronic device. Examples of electronic devices may include, without limitation, a processing system, computer, server, work station, appliance, terminal, personal computer, laptop, ultra-laptop, handheld computer, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In one embodiment, for example, a processing system may include one or more processors. A processor may comprise any hardware element or software element arranged to process information or data. Some examples of processors may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor may be implemented as a general purpose processor. Alternatively, the processor may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, a processing device may include one or more memory units coupled to the processors. A memory unit may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, and so forth. The embodiments are not limited in this context.

Some embodiments, such as apparatus 100, may be implemented as part of a communication system. A communication system may comprise multiple logic devices arranged to communicate information or data to each other. When implemented as a wireless communication system, one or more logic devices may include various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. When implemented as a wired communication system, one or more logic devices may include various elements suitable for wired communications, such as one or more input/output (I/O) adapters, physical connectors to connect the I/O adapter with a corresponding wired communications medium, communication interfaces, network interface card (NIC), and other wired elements. Examples of wired communications media may include wire, cable, metal leads, printed circuit board (PCB), backplane, switch fabric, semiconductor material, twisted-pair wire, co-axial cable, fiber optics, and so forth. The embodiments are not limited in this context.

Some embodiments may be implemented as an article of manufacture. The article of manufacture may include a storage medium to store logic and/or data for performing various operations of one or more embodiments. The storage medium may represent any storage media capable of storing data or information, such as volatile or non-volatile memory, removable or non-removable memory, erasable or non-erasable memory, writeable or re-writeable memory, and so forth. Examples of storage media may include, without limitation, those examples as previously provided for memory units. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising a base station having base station logic to determine a channel quality indicator feedback dimension value representing a number of resource blocks for an orthogonal frequency division multiple access system to be measured by a subscriber station based on a matching ratio value, and a transceiver to send said channel quality indicator feedback dimension value to said subscriber station, said base station logic to determine said matching ratio value based on a subscriber station value representing a number of subscriber stations requesting service to said system, a matching set value representing a number of resource blocks allocated for said system, and a matching size value representing a number of resource blocks assigned to said subscriber stations and to dynamically increase the channel quality indicator feedback dimension value as a number of subscriber stations decreases or decrease the channel quality indicator feedback dimension value as a number of subscriber stations increases to adapt channel quality indicator feedback granularity to a current system load of the base station.

2. The apparatus of claim 1, said base station logic to increase said channel quality indicator feedback dimension value to increase said matching ratio value.

3. The apparatus of claim 1, comprising a subscriber station having subscriber station logic to receive said channel quality indicator feedback dimension value, measure a channel quality for one or more resource blocks indicated by said channel quality indicator feedback dimension value, and send a channel quality indicator representing said channel quality measurements to said base station.

4. The apparatus of claim 1, comprising an omnidirectional antenna coupled to said transceiver.

5. A method, comprising:
determining a channel quality indicator feedback dimension value representing a number of resource blocks for an orthogonal frequency division multiple access system to be measured by a subscriber station based on a matching ratio value;
sending said channel quality indicator feedback dimension value to said subscriber station;
determining said matching ratio value based on a subscriber station value representing a number of subscriber stations requesting service to said system, a matching set value representing a number of resource blocks allocated for said system, and a matching size value representing a number of resource blocks assigned to said subscriber stations; and
dynamically increasing the channel quality indicator feedback dimension value as a number of subscriber stations decreases or decreasing the channel quality indicator feedback dimension value as a number of subscriber stations increases to adapt channel quality indicator feedback granularity to a current system load.

6. The method of claim 5, comprising receiving a channel quality indicator representing a channel quality measurement for said resource blocks indicated by said channel quality indicator feedback dimension value from said subscriber station.

7. The method of claim 5, comprising increasing said channel quality indicator feedback dimension value to increase said matching ratio value.

8. The method of claim 5, comprising determining said matching ratio value representing a ratio denoting a number of subscriber stations allocated a resource block relative to a number of subscribers stations requesting service to said system or a number of resource blocks allocated for said system.

9. The method of claim 5, comprising determining said matching ratio value based on a subscriber station value representing a number of subscriber stations requesting service to said system, said matching ratio value to decrease as said subscriber station value increases.

10. The method of claim 5, comprising decreasing said channel quality indicator feedback dimension value to decrease said matching ratio value.

11. A method, comprising:
receiving a channel quality indicator feedback dimension value from a base station by a subscriber station, the channel quality indicator feedback dimension value representing a number of resource blocks to be measured by the subscriber station based on a matching ratio value, the matching ratio value based on a subscriber station value representing a number of subscriber stations requesting service to said system, a matching set value representing a number of resource blocks allocated for said system, and a matching size value representing a number of resource blocks assigned to said subscriber stations;
measuring a channel quality for one or more resource blocks for an orthogonal frequency division multiple access system as indicated by said channel quality indicator feedback dimension value; and
sending a channel quality indicator representing said channel quality measurements to said base station;
wherein the channel quality indicator feedback dimension value is dynamically increased as a number of subscriber stations decreases or dynamically decreased as a number of subscriber stations increases to adapt channel quality indicator feedback granularity to a current system load.

12. The method of claim 11, comprising:
identifying unassigned resource blocks; and
measuring a channel quality for a number of said unassigned resource blocks as indicated by said channel quality indicator feedback dimension value.

13. The method of claim 11, comprising:
identifying assigned resource blocks having a link quality value lower than a defined link quality value; and measuring a channel quality for a number of said assigned resource blocks as indicated by said channel quality indicator feedback dimension value.

14. An article comprising a storage medium containing instructions that if executed enable a system to:
- determine a channel quality indicator feedback dimension value representing a number of resource blocks for an orthogonal frequency division multiple access system to be measured by a subscriber station based on a matching ratio value;
- determine said matching ratio value based on a subscriber station value representing a number of subscriber stations requesting service to said system, a matching set value representing a number of resource blocks allocated for said system, and a matching size value representing a number of resource blocks assigned to said subscriber stations;
- send said channel quality indicator feedback dimension value to said subscriber station; and
- dynamically increase the channel quality indicator feedback dimension value as a number of subscriber stations decreases or decrease the channel quality indicator feedback dimension value as a number of subscriber stations increases to adapt channel quality indicator feedback granularity to a current system load.

15. The article of claim 14, further comprising instructions that if executed enable the system to receive a channel quality indicator representing a channel quality measurement for said resource blocks indicated by said channel quality indicator feedback dimension value from said subscriber station.

16. The article of claim 14, further comprising instructions that if executed enable the system to increase said channel quality indicator feedback dimension value to increase said matching ratio value.

17. The article of claim 14, further comprising instructions that if executed enable the system to determine said matching ratio value representing a ratio denoting a number of subscriber stations allocated a resource block relative to a number of subscribers stations requesting service to said system or a number of resource blocks allocated for said system.

18. The article of claim 14, further comprising instructions that if executed enable the system to determine said matching ratio value based on a subscriber station value representing a number of subscriber stations requesting service to said system, said matching ratio value to decrease as said subscriber station value increases.

19. The article of claim 14, further comprising instructions that if executed enable the system to decrease said channel quality indicator feedback dimension value to decrease said matching ratio value.

20. An article comprising a storage medium containing instructions that if executed enable a system to:
- receive a channel quality indicator feedback dimension value from a base station by a subscriber station, the channel quality indicator feedback dimension value representing a number of resource blocks to be measured by the subscriber station based on a matching ratio value, the matching ratio value based on a subscriber station value representing a number of subscriber stations requesting service to said system, a matching set value representing a number of resource blocks allocated for said system, and a matching size value representing a number of resource blocks assigned to said subscriber stations;
- measure a channel quality for one or more resource blocks for an orthogonal frequency division multiple access system as indicated by said channel quality indicator feedback dimension value; and
- send a channel quality indicator representing said channel quality measurements to said base station;
- wherein the channel quality indicator feedback dimension value is dynamically increased as a number of subscriber stations decreases or dynamically decreased as a number of subscriber stations increases to adapt channel quality indicator feedback granularity to a current system load.

21. The article of claim 14, further comprising instructions that if executed enable the system to:
- identify unassigned resource blocks; and
- measure a channel quality for a number of said unassigned resource blocks as indicated by said channel quality indicator feedback dimension value.

22. The article of claim 14, further comprising instructions that if executed enable the system to:
- identify assigned resource blocks having a link quality value lower than a defined link quality value; and
- measure a channel quality for a number of said assigned resource blocks as indicated by said channel quality indicator feedback dimension value.

* * * * *